United States Patent [19]

Fijany et al.

[11] Patent Number: 5,218,709

[45] Date of Patent: Jun. 8, 1993

[54] SPECIAL PURPOSE PARALLEL COMPUTER ARCHITECTURE FOR REAL-TIME CONTROL AND SIMULATION IN ROBOTIC APPLICATIONS

[75] Inventors: Amir Fijany, Sherman Oaks; Antal K. Bejczy, Pasadena, both of Calif.

[73] Assignee: The United States of America as represented by the Administrator of the National Aeronautics and Space Administration, Washington, D.C.

[21] Appl. No.: 458,280

[22] Filed: Dec. 28, 1989

[51] Int. Cl.[5] .................. G06F 9/00; G06F 15/16
[52] U.S. Cl. ....................... 395/800; 364/231.9; 364/DIG. 1
[58] Field of Search ............. 395/800, 375, 650; 364/736

[56] References Cited

U.S. PATENT DOCUMENTS

| | | | |
|---|---|---|---|
| 3,753,238 | 8/1973 | Tutelman | 340/172.5 |
| 4,441,152 | 4/1984 | Matsuura et al. | 364/200 |
| 4,467,436 | 8/1984 | Chance et al. | 364/513 |
| 4,470,114 | 9/1984 | Gerhold | 364/200 |
| 4,574,345 | 3/1986 | Konesky | 364/200 |
| 4,574,394 | 3/1986 | Hiksztynski et al. | 382/41 |
| 4,591,981 | 5/1986 | Kassabov | 364/200 |
| 4,633,392 | 12/1986 | Vincent et al. | 364/200 |
| 4,684,862 | 8/1987 | Rohrle | 318/568 |
| 4,736,291 | 4/1988 | Jennings et al. | 364/200 |
| 4,814,973 | 3/1989 | Hillis | 395/800 |
| 4,873,626 | 10/1989 | Gifford | 395/325 |
| 4,891,787 | 1/1990 | Gifford | 395/375 |
| 5,016,163 | 5/1991 | Jesshope et al. | 395/800 |
| 5,050,065 | 9/1991 | Dartois et al. | 395/650 |

OTHER PUBLICATIONS

A. Fijany et al., "Parallel Algorithms & Arch. for Manipulator Inverse Dynamics" Advan. Robotics: 1989 Proc. of the 14th Inter. Con. on Adv. Rob., Columbus, Ohio, Jun. 13-15, 1989, pp. 202-233.

Primary Examiner—Parshotam S. Lall
Assistant Examiner—Ayni Mohamed
Attorney, Agent, or Firm—John H. Kusmiss; Thomas H. Jones; Guy M. Miller

[57] ABSTRACT

A Real-time Robotic Controller and Simulator (RRCS) with an MIMD-SIMD parallel architecture for interfacing with an external host computer provides a high degree of parallelism in computation for robotics control and simulation. A host processor receives instructions from, and transmits answers to, the external host computer. A plurality of SIMD microprocessors, each SIMD processor being an SIMD parallel processor, is capable of exploiting fine-grain parallelism and is able to operate asynchronously to form an MIMD architecture. Each SIMD processor comprises an SIMD architecture capable of performing two matrix-vector operations in parallel while fully exploiting parallelism in each operation. A system bus connects the host processor to the plurality of SIMD microprocessors and a common clock provides a continuous sequence of clock pulses. A ring structure interconnects the plurality of SIMD microprocessors and is connected to the clock for providing clock pulses to the SIMD microprocessors and provides a path for the flow of data and instructions between the SIMD microprocessors. The host processor includes logic for controlling the RRCS by interpreting instructions sent by the external host computer, decomposing the instructions into a series of computations to be performed by the SIMD microprocessors, using the system bus to distribute associated data among the SIMD microprocessors, and initiating activity of the SIMD microprocessors to perform the computations on the data by procedure call.

14 Claims, 2 Drawing Sheets

SPECIAL PURPOSE PARALLEL COMPUTER ARCHITECTURE FOR REAL-TIME CONTROL AND SIMULATION IN ROBOTIC APPLICATIONS

ORIGIN ON THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to computer architectures and, more particularly, to a Real-time Robotic Controller and Simulator (RRCS) which is a MIMD-SIMD parallel architecture for interfacing with an external host computer and for providing a high degree of parallelism in computations for robotic control and simulation in response to instructions from the external host computer comprising, host processor means for receiving instructions from the external host computer and for transmitting answers to the external host computer; a plurality of SIMD micro-processors, each the SIMD processor being a SIMD parallel processor capable of exploiting fine grain parallelism, the SIMD processors further being able to operate asynchronously to form a MIMD architecture, each the SIMD processor comprising a SIMD architecture capable of performing two matrix-vector operations in parallel while fully exploiting parallelism in each operation, each the SIMD micro-processor comprising,

- a single control unit including a program counter, a program memory, pipeline registers, and control and timing logic, the pipeline registers including provisions to receive instruction portions corresponding to an address field, an instruction field, and a control field, respectively, of instructions to be executed,
- a control bus,
- an address bus,
- a data bus,
- an instruction bus,
- a memory,
- a plurality of processor elements,
- host interface means for interfacing between the host processor means, the control unit, the control bus, the address bus, the data bus, the instruction bus, and the memory,
- means for obtaining the sequence of clock pulses from the ring structure means and for connecting it to the control unit and each of the processor elements, and
- neighbor interface means for allowing each the SIMD processor to communicate with next adjacent SIMD processors on its "right" and "left" along the ring structure means; a system bus connecting the host processor means to the plurality of SIMD micro-processors; a common clock providing a continuous sequence of clock pulses; and, ring structure means interconnecting the plurality of SIMD micro-processors and connected to the clock for providing the clock pulses to the SIMD micro-processors and for providing a path for the flow of data and instructions between the SIMD micro-processors; and wherein, the host processor means further comprises means for controlling the RRCS by interpreting instructions sent by the external host computer, decomposing the instructions into a series of computations to be performed by the SIMD micro-processors, using the system bus to distribute associated data among the SIMD micro-processors, and initiating activity of the SIMD micro-processors to perform the computations on the data by procedure call, the basic synchronization mechanism of the RRCS being data driven but the host processor means further comprising means for causing clock based synchronization among the SIMD processors.

In the preferred embodiment, there are six the processor elements and the control and timing logic includes logic for causing the processor elements to alternatively perform six independent primitive operations in parallel or form two groups of three processor elements to perform two basic (matrix-vector) operations in parallel. Also, the control and timing logic includes logic for causing all six the processor elements to form a single group to exploit parallelism in matrix multiplication. Further, in computing vector addition or scalar-vector multiplication by a group of the processor elements the control and timing logic includes logic for causing parallelism in the operation to be exploited by performing an independent addition or multiplication by each of the processor elements while the operation of three processor elements within a same group are synchronized. Moreover, in computing matrix-vector multiplication or vector-cross-product by a group of three the processor elements the control and timing logic includes logic for causing parallelism to be exploited by the performing of three independent vector-dot products wherein the group of the processor elements is distinguished by global synchronization and sharing of common data.

BACKGROUND ART

In the field of computers used for real-time control and simulation, there are often unique problems. This is particularly true in the field of robotics wherein the movement of multijointed arms, and the like, creates a computationally intensive environment. Inadequate computing power has always been the major obstacle in real-time implementation of advanced robotic schemes, due to the computational cost of the evaluation of required kinematic and dynamic models. Dynamic simulation of the robot arm requires even more computing power than does control. The problem becomes more difficult for direct-drive arms, representing even faster dynamics, and for redundant and multiple arms, which involve more degrees of freedom (DOF). Thus, it is widely recognized that parallel computing is the key solution for achieving required computing power for real-time control and simulation.

The parallel operation of digital computers is certainly not a new concept. So-called multi-processing has been employed in various computationally intensive environments for a long time. Likewise, it is well known to employ a large number of computing nodes linked on a token passing ring, or the like, to solve major computational problems through a technique called distributed processing wherein one node is in charge of distributing the workload among the various other nodes. Large commercial networks in the order of several hundred computers on a common ring have been employed in the off-hours, for example, to perform "ray tracing" graphics generation. When so employed, the network of smaller work stations or nodes can have a combined computing power equal to one of the multimillion dollar super computers. It is to be understood (and is well known to those skilled in the art) that the foregoing examples of multi-processing and distributed processing employ a number of stand-alone computers which accomplish their common task through the sending and receiving of messages between the computers which assign tasks, pass results, etc.

In investing the problems particularly unique to advanced robotics, the inventors herein quickly demonstrated that for kinematic and dynamic problems, particularly those required for real-time control, a pipelined architecture of a number of digital computers cannot reduce the computation time; that is, for these problems, concurrency can only be achieved by exploiting parallelism. There are, however, several problems attendant to exploiting parallelism in this particular application which must be considered. The inventors' studies on the matter resulted in the conclusion that there is a high degree of parallelism inherent in these particular computational problems. The difficulty in exploiting this parallelism results from the fact that it exists in different forms and at different levels in the computations. Attempts at exploiting this inherent parallelism with conventional parallel architectures have failed since these architectures are capable of exploiting only one type of parallelism; namely, either Single Instruction—Multiple Data (SIMD) or Multiple Instruction—Multiple Data (MIMD).

Some thought has been done by others skilled in the art in an attempt to provide a parallel computer architecture which is particularly suitable for robotic uses. In this regard, for example, there is the 1984 U.S. Pat. No. 4,467,436 of Chance et al. entitled ROBOT ARM CONTROLLER WITH COMMON BUS MEMORY. A very similar architecture is shown in the 1986 patent of Konesky (U.S. Pat. No. 4,574,345), which is not stated to be specifically for robotic use. Neither addresses the problem of optimizing a computational environment where (SIMD) and (MIMD) exist in the same problem.

There are two important features of such control computation problems that should be considered simultaneously—the asymptotic computation complexity and the size of the problem (i.e. the degrees of freedom involved). Computation complexity of almost all problems are of order $O(n)$, where n represents the number of degrees of freedom. The inventors herein have shown that these problems all belong to Nick's Class; that is, there are existing parallel algorithms with asymptotic computation complexity ($O(\log_2(n))$) for solving these problems; however, this parallelism is coarse grained and leads to a rather small speed-up even for highly redundant robot arms. These observations imply that for these problems the following constraints apply:

a) Reducing the coefficients of the polynomial complexity is more important than reducing the asymptotic complexity, and b) Parallelism is best exploited if the architecture is capable of employing the features of both MIMD and SIMD types of parallel processing.

At the lowest level, parallelism exists in matrix and vector operations, which is at least as significant (and for some problems, more significant than) logarithmic parallelism. The difficulty in exploiting this type of parallelism results from the small dimensions of the matrices and vectors. Hence, unlike most other scientific computations, matrix-vector operations related to robotic simulation and control cannot be performed efficiently by classical array processors such as pipeline processors or systolic arrays.

STATEMENT OF THE INVENTION

Accordingly, it is an object of this invention to provide a heirarchical approach for mapping robotic real-time simulation and control problems onto an architecture capable of exploiting parallelism using both SIMD and MIMD processing.

It is another object of this invention to provide an architecture capable of exploiting parallelism using both SIMD and MIMD processing for use with robotic real-time simulation and control problems and employing a new class of parallel algorithms.

Other objects and benefits of this invention will become apparent from the detailed description which follows hereinafter when taken in conjunction with the drawing figures which accompany it.

DETAILED DESCRIPTION OF THE INVENTION

Figure 1:
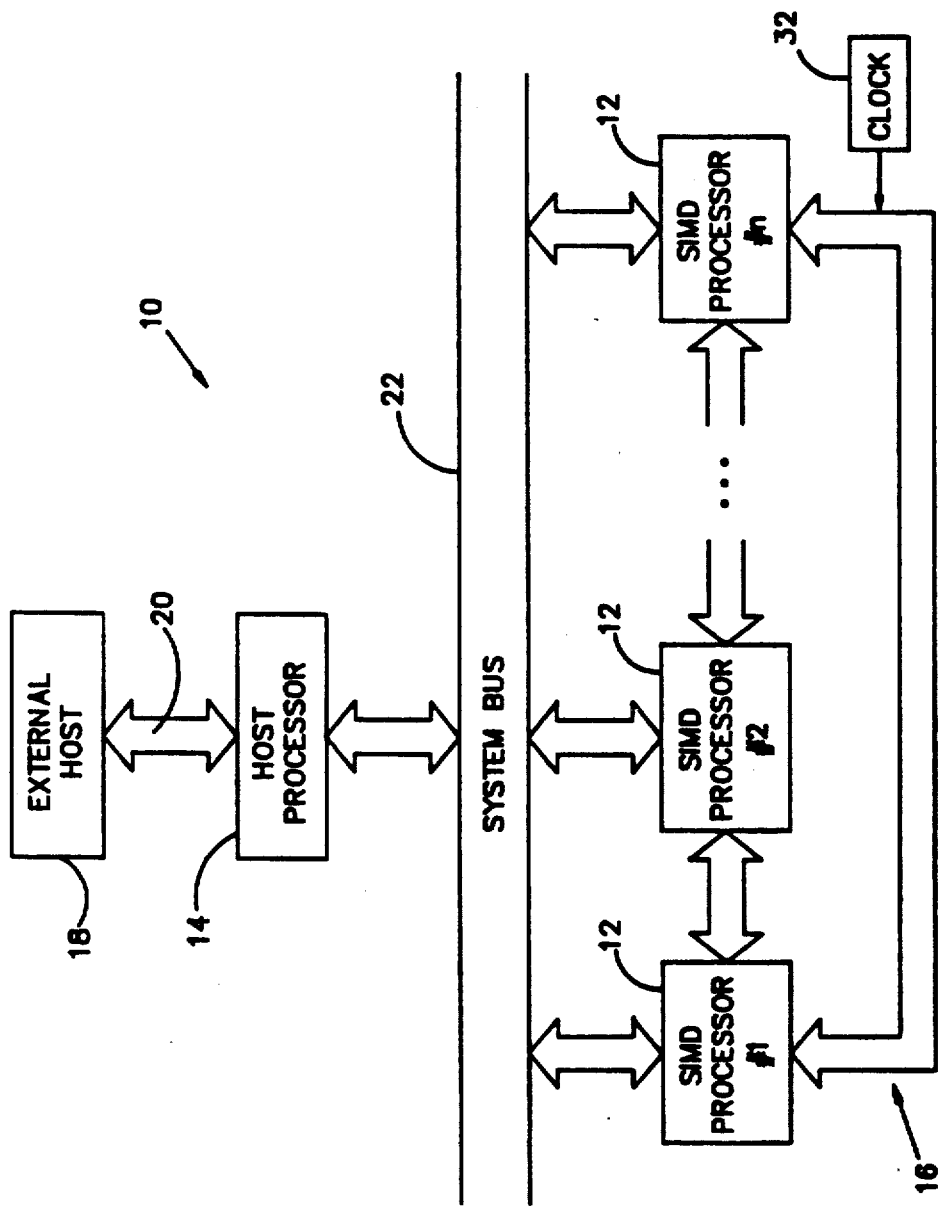
FIG. 1 is a simplified functional block diagram of the Real-time Robotic Controller and Simulator (RRCS) of this invention.

The Real-time Robotic Controller and Simulator (RRCS) of this invention is shown in functional block diagram form in FIG. 1 where it is generally indicated as 10. Unlike known prior art parallel computer architectures which are designed as either a MIMD or a SIMD architecture, the principle point of novelty of the specialized computer architecture of the RRCS 10 of this invention is that it is designed to be a combined MIMD-SIMD architecture. The RRCS 10 employs a plurality of individual SIMD processors 12 (labelled "1" through "n" in the drawing figure), capable in concert of MIMD parallel processing. Each SIMD processor 12 uses a SIMD architecture (to be defined in detail hereinafter) capable of performing two matrix-vector operations in parallel while fully exploiting parallelism in each operation. In this sense, the architecture of each SIMD processor 12 is optimized for the size of the matrices and vectors involved in the robotics problems of particular interest. Furthermore, the design of the RRCS 10 allows the full exploitation of parallelism at several levels in the computation, while minimizing overhead.

For purposes of interfacing to the outside world, the RRCS 10 in its preferred embodiment as depicted in FIG. 1 is configured to appear as an attached processor which can be interfaced to the bus of an external host computer as a part of the bus memory. In addition to the SIMD processors 12, the RRCS 10 includes a host processor 14 which, as will be seen shortly, handles the interface with the external host computer 18, controls the activity of the SIMD processors 12, and performs the required input/output operations. As mentioned above, each SIMD processor 12 is a SIMD parallel processor capable of exploiting fine grain parallelism; and, the SIMD processors 12 can operate asynchronously and form a MIMD architecture. Therefore, from an architectural point of view, the RRCS 10 is a MIMD-SIMD parallel architecture.

The SIMD processors 12 are interconnected through a ring structure 16 of a type well known in the art which provides for a reliable clock distribution among the SIMD processors 12 from the single clock 28 as well as a high speed communications path among them. The perfect shuffle topology, which is required for exploiting logarithmic parallelism, is provided by message passing along the communications path of the ring structure 16, which reduces the overhead typically associated with message passing. The basic synchronization mechanism of the RRCS 10 is data driven; however, the fact that all the SIMD processors 12 are driven by the same clock, i.e. the clock 28, and a regularity of the computations allows clock based synchronization among the SIMD processors 12. This is a major point of deviation from the typical multi-processor computer architecture in which each processor or node is totally self-contained (i.e. includes its own asynchronous clock) and the only cohesive aspect of the system is the passing of messages between the nodes which, otherwise, operate independently on the common system tasks.

In the RRCS 10, the host processor 14 controls the whole architecture by interpreting instructions sent by the external host computer 18 at the interface 20. These instructions are decomposed by the host processor 14 into a series of computations to be performed by the SIMD processors 12. The SIMD processors 12 can be considered as the memories of the host processor 14. Depending on the required computation in each case, the host processor 14 uses the system bus 22 to distribute the associated data among the SIMD processors 12 and initiate their activities by procedure call in a manner well known to those skilled in the art. The activity of the SIMD processors 12 is then carried out independently from the host processor 14. The end of the computation is indicated by the SIMD processors 12 to the host processor 14 (over the system bus 22), which then transfers the results to the external host computer 18 via interface 20. At first, it may appear that what has just been described is no different from any other multiprocessor system in which one computer allocates tasks among the others, which then perform their portion of the task and provide their inputs to the central distribution point. In this regard, it must be remembered that it was said that once the host processor 14 distributes the data to the SIMD processors 12 and initiates their activity by procedure call, the SIMD processors 12 then perform "independently" from the host processor 14. This is not to say that, depending on the computation being performed, they do not work in concert. Certainly, because of the common clock 20 driving them, they can work synchronously and not always asynchronously, as is the case in the typical prior art multiprocessor system. This novel aspect of the present invention will be returned to in more detail shortly.

Figure 2:
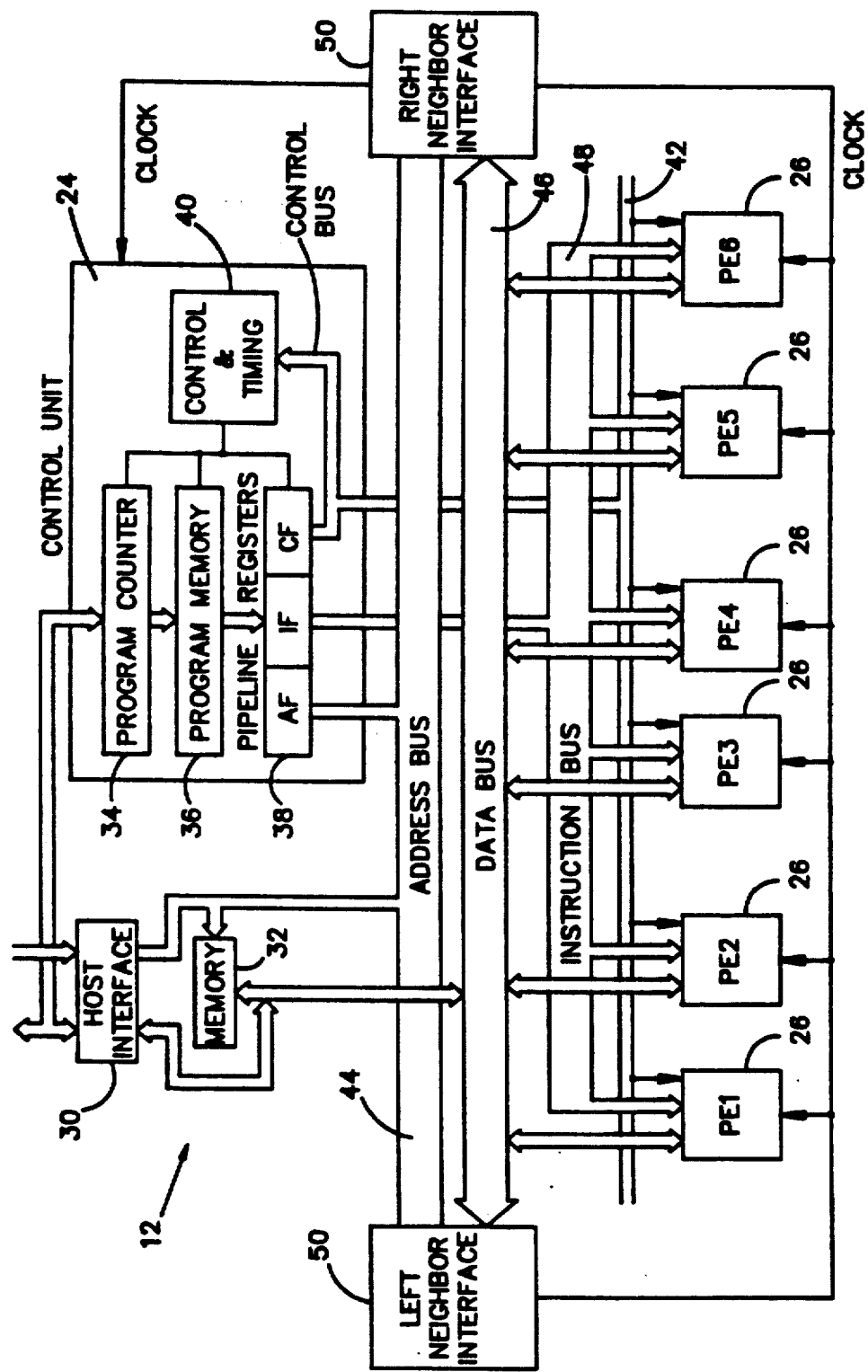
FIG. 2 is a functional block diagram of one of the SIMD micro-processors employed in the RRCS of this invention.

Turning now to FIG. 2, the preferred architecture of a typical SIMD processor 12 of the present invention is shown in functional block diagram form. Each SIMD processor 12 comprises a single control unit 24 and six processor elements 26. As indicated in the figure, the clock signal from the common clock 28 is obtained from the ring structure 16 and connected to the control unit 24 as well as each of the processor elements 26. Each SIMD processor 12 also includes a host interface 30 which interfaces with the host processor 14 as well as the control unit 24, the various buses within the SIMD processor 12, and the memory 32 of the SIMD processor 12 as well. The control unit 24 includes a program counter 34, a program memory 36, pipeline registers 38, and control and timing logic 40. The SIMD processor 12 is basically a micro-processor and, therefore, in the interest of simplicity and the avoidance of redundancy, those aspects of micro-processor operation which are well known to those skilled in the art will not be addressed in any detail herein—only those aspects which are unique to the SIMD processor 12 in particular and the RRCS in general will be addressed in any detail. The pipeline registers 38 include provisions to receive instruction portions designated as "AF", "IF", and "CF", as indicated in the drawing figure. These correspond to an address field, an instruction field, and a control field of each instruction to be executed, respectively. Each SIMD processor 12 includes a control bus 42, an address bus 44, a data bus 46, and an instruction bus 48. There are also neighbor interfaces 50 by means of which each SIMD processor 12 communicates with other SIMD processors 14 on its "right" and "left" along the ring structure 16 in the usual manner. As will be understood by those skilled in the art from an inspection of the drawing of FIG. 2, the control and timing logic 40 can use the facilities as described above and connected as shown to control the operation of the various processor elements 26 in the manner now to be described.

Under the control of the control unit 24, the processor elements 26 can perform six independent primitive operations in parallel or form two groups of three processor elements 26 to perform two basic (matrix-vector) operations in parallel. For other computation problems in robotics, e.g. forward kinematics, Jacobian, and forward dynamics, matrix multiplication is required. In this case, under the control of the control unit 24, all six processor elements 26 form a single group to exploit parallelism in matrix multiplication. In computing vector addition or scalar-vector multiplication by a group of processor elements 26, parallelism in the operation is exploited by performing an independent addition or multiplication by each of the processor elements 26; but, the operation of the three processor elements 26 within the same group are synchronized by the control unit 24. In computing matrix-vector multiplication or vector-cross-product by a group of three processor elements 26, parallelism is exploited by performing three independent vector-dot products (a series of multiply and add/subtract operations). In this case, the group of processor elements 26 are distinguished by their global synchronization and sharing of the common data. For example, in computing matrix-vector multiplication, while each row of the matrix is read for a corresponding processor element 26, the components of the vector are read for all processor elements 26 of the same group. This provides the possibility of exploiting parallelism in read operations since, once data is fetched, it can be read by several processor elements 26. Also, in performing two similar or different matrix-vector operations, the operation of two groups of processor elements 26 are synchronized by the control unit 24. Furthermore, if the operations share some data, then the common data can be read by the processor elements 26 of the different groups thereby increasing the parallelism in read operations.

The above-described organization provides the required flexibility since the processor elements 26 can be grouped by the control unit 24 according to the needs of the particular operation. Problems may arise as a result, however. For one, if processor elements 26 perform different operations in parallel, then different instructions for different processor elements 26 are needed.

One solution might be to provide individual instructions for each of the processor elements 26; however, that solution will lead to complexity and increase the width of the control unit's microprogrammed instructions. For another, the memory organization and data routing among the processor elements 26, which are the classical issues in designing the SIMD architectures, become even more difficult because of the required flexibility.

Two features of the RRCS 10 of this invention can be exploited for solving the above problems. The first feature, which is common in all considered problems, is the locality in the operation; that is, the computation is performed on a small amount of data which reduces the size of required memory. Hence, a cache memory can be used as the basic memory 32 of the SIMD processor 12, which provides a very fast access. The second feature is that, in any type of operation, one instruction may be used by several processor elements 26 since the number of possible instructions is limited (i.e. add/subtract, multiply, and multiply and add/subtract). Hence, once an instruction is issued, it can be used by several processor elements 26. Exploiting the above features, the problem of the flexibility of the processor elements 26 and memory is solved by the control unit 24 time multiplexing the operations of the processor elements 26. The control unit 24 is designed to operate several times faster than the processor elements 26, which means that the control unit 24 is capable of fetching the data and sending the instructions much faster than the processor elements 26 perform the operations.

The processor elements 26 employed in the above-described architecture in tested embodiments thereof is a simple processor (Ser. No. 74516) capable of performing primitive arithmetic operations (add/subtract, multiply, multiply and add/subtract, division, etc.). The processor can be run with a clock frequency of 6 MHz while the primitive operations (except division) require nine to twelve clock cycles to be completed. The processor has only one bus, which means that two clock cycles are needed for loading the operands. Also, each operation is defined by the sequence of two instructions. At each clock cycle, one operand along with one instruction can be loaded. The combination of two loaded instructions defines the type of operation to be performed. The control unit 24 runs with the same frequency as the processors (i.e. the processor elements 26), which means that, exploiting parallelism in reading data and instructions, all the processor elements 26 can be activated by the control unit 24 within a few clock cycles and perform different operations in parallel. This scheme, besides providing the desired flexibility, reduces the complexity of the microprogram. In fact, the microcode for the architecture as built and tested in only twenty-four bits with only horizontal decoding (i.e. without any vertical decoding), which greatly simplifies the microprogramming.

The processor elements 26 are capable of performing 16-bit fractionary fixed-point operations. Using fractionary instead of integer arithmetic simplifies the scaling problems since multiplication does not create overflow and the processor elements 26 perform the rounding under the control of the control unit 24; however, a different scaling scheme is required for each specific arm of the robotic apparatus under control or simulation. It should be emphasized that the performance of the above-described architecture of the RRCS 10 of this invention and its unique manner of operation does not result from the speed of the processor elements 26 or the performing of fixed-point operations. In fact, the processor elements 26 are very slow since they perform fixed-point multiplication in 1.5 μsec. As is well known, many commercially available floating-point processors are more than an order of magnitude faster in performing floating-point operations. The overall increased performance of the architecture of this invention in the particular environment for which it was particularly and uniquely designed results from (1) its capability of exploiting parallelism at different levels in the computation, (2) by employing many processor elements 26, and (3) by minimizing overhead.

Wherefore, having thus described our invention, what is claimed is:

1. A Real-time Robotic Controller and Simulator (RRCS) for interfacing with an external host computer and providing a high degree of parallelism in computations for robotic control and simulation in response to instructions from the external host computer, said Real-time Robotic Controller and Simulator comprising:

a) host processor means for receiving instructions from the external host computer and for transmitting answers to the external host computer:

b) a plurality of parallel SIMD processors, said SIMD processors operable asynchronously in an MIMD architecture, each said SIMD processor comprising a SIMD architecture capable of performing two matrix-vector operations in parallel while fully exploiting parallelism in each operation:

c) a system bus connecting said host processor means to said plurality of SIMD processors:

d) a common clock providing a continuous sequence of clock pulses: and, e) ring structure means interconnecting said plurality of SIMD processors and connected to said clock for providing said clock pulses to said SIMD processors and for providing a path for the flow of data and instructions between said SIMD processors; and wherein, f) said host processor means further comprises means for controlling the RRCS by interpreting instructions sent by the external host computer, decomposing said instructions into a series of computations to be performed by said SIMD processors, using said system bus to distribute associated data among said SIMD processors, and initiating activity of said SIMD processors to perform said computations on said data; and wherein, g) each said SIMD processor further comprises,
  g1) a single control unit including a program counter, a program memory, pipeline registers, and control and timing logic, said pipeline registers including provisions to receive instruction portions corresponding to an address field, an instruction field, and a control field, respectively, of instructions to be executed,
  g2) a control bus,
  g3) an address bus,
  g4) a data bus,
  g5) an instruction bus,
  g6) a memory,
  g7) a plurality of processor elements,
  g8) host interface means for interfacing between said host processor means, said control unit, said control bus, said address bus, said data bus, said instruction bus, and said memory,
  g9) means for obtaining said sequence of clock pulses from said ring structure means and for connecting it to said control unit and each of said processor elements, and g10) neighbor interface means for allowing each said SIMD processor to communicate with next adjacent SIMD processors along said ring structure means.

2. The Real-time Robotic Controller and Simulator (RRCS) of claim 1 wherein there are six said processor elements and wherein additionally:

said control and timing logic includes logic for causing said processor elements to alternatively perform six independent primitive operations in parallel or form two groups of three processor elements to perform two basic (matrix-vector) operations in parallel.

3. The Real-time Robotic Controller and Simulator (RRCS) of claim 1 wherein there are six said processor elements and wherein additionally:

said control and timing logic includes logic for causing all six said processor elements to form a single groups to exploit parallelism in matrix multiplication.

4. The Real-time Robotic Controller and Simulator (RRCS) of claim 1 wherein there are six said processor elements and wherein:

in computing vector addition or scalar-vector multiplication by a group of said processor elements said control and timing logic includes logic for causing parallelism in the operation to be exploited by performing an independent addition or multiplication by each of said processor elements while the operation of three processor elements within a same group are synchronized.

5. The Real-time Robotic Controller and Simulator (RRCS) of claim 1 wherein there are six said processor elements and wherein:

in computing matrix-vector multiplication or vector-cross-product by a group of three said processor elements said control and timing logic includes logic for causing parallelism to be exploited by the performing of three independent vector-dot products wherein said group of said processor elements is distinguished by global synchronization and sharing of common data.

6. The Real-time Robotic Controller and Simulator (RRCS) of claim 1 wherein said SIMD architecture of each said SIMD processor comprises plural processing elements comprising means for performing plural operations simultaneously within said SIMD processor.

7. The Real-time Robotic Controller and Simulator (RRCS) of claim 6 wherein said SIMD architecture of each said SIMD processor further comprises means for causing said processor elements to perform plural independent primitive operations simultaneously by respective plural groups of said processing elements.

8. The Real-time Robotic Controller and Simulator (RRCS) of claim 6 wherein said plural groups comprise one of: (a) six groups of one processor element each for performing six primitive operations simultaneously, and (b) two groups of three processor elements each for performing two three-dimensional operations simultaneously.

9. The Real-time Robotic Controller and Simulator (RRCS) of claim 1 wherein a basic synchronization mechanism of the RRCS is data driven but wherein additionally:

said host processor means further comprises means for causing clock based synchronization among said SIMD processors.

10. A Real-time Robotic Controller and Simulator (RRCS) for interfacing with an external host computer and providing a high degree of parallelism in computations for robotic control and simulation in response to instructions from the external host computer, said Real-time Robotic Controller and Simulator comprising:

a) host processor means for receiving instructions from the external host computer and for transmitting answers to the external host computer;

b) a plurality of parallel SIMD processors, said SIMD processors further being able to operate asynchronously to form a MIMD architecture, each said SIMD processor capable of performing two matrix-vector operations in parallel while fully exploiting parallelism in each operation;

c) ring structure means interconnecting said plurality of SIMD processors and connected to a common clock for providing clock pulses to said SIMD processors and for providing a path for the flow of data and instructions between said SIMD processors;

d) each said SIMD processor comprising, d1) a single control unit including a program counter, a program memory, pipeline registers, and control and timing logic, said pipeline registers including provisions to receive instruction portions corresponding to an address field, an instruction field, and a control field, respectively, of instructions to be executed, d2) a control bus, d3) an address bus, d4) a data bus, d5) an instruction bus, d6) a memory, d7) a plurality of processor elements, d8) host interface means for interfacing between said host processor means, said control unit, said control bus, said address bus, said data bus, said instruction bus, and said memory.

d9) means for obtaining said sequence of clock pulses from said ring structure means and for connecting it to said control unit and each of said processor elements, and d10) neighbor interface means for allowing each said SIMD processor to communicate with next adjacent SIMD processors along said ring structure means;

e) a system bus connecting said host processor means to said plurality of SIMD processors; and f) said host processor means further comprises means for controlling the RRCS by interpreting instructions sent by the external host computer, decomposing said instructions into a series of computations to be performed by said SIMD processors, using said system bus to distribute associated data among said SIMD processors, and initiating activity of said SIMD processors to perform said computations on said data.

11. The Real-time Robotic Controller and Simulator (RRCS) of claim 10 wherein there are six said processor elements and wherein additionally:

said control and timing logic includes logic for causing said processor elements to alternatively perform six independent primitive operations in parallel or form two groups of three processor elements to perform two basic (matrix-vector) operations in parallel.

12. The Real-time Robotic Controller and Simulator (RRCS) of claim 10 wherein there are six said processor elements and wherein additionally:

said control and timing logic includes logic for causing all six said processor elements to form a single group to exploit parallelism in matrix multiplication.

13. The Real-time Robotic Controller and Simulator (RRCS) of claim 10 wherein there are six said processor elements and wherein:

in computing vector addition or scalar-vector multiplication by a group of said processor elements said control and timing logic includes logic for causing parallelism in the operation to be exploited by performing an independent addition or multiplication by each of said processor elements while the operation of three processor elements within a same group are synchronized.

14. The Real-time Robotic Controller and Simulator (RRCS) of claim 10 wherein there are six said processor elements and wherein:

in computing matrix-vector multiplication or vector-cross-product by a group of three said processor elements said control and timing logic includes logic for causing parallelism to be exploited by the performing of three independent vector-dot products wherein said group of said processor elements is distinguished by global synchronization and sharing of common data.

* * * * *